US012424062B2

(12) United States Patent
Hamman et al.

(10) Patent No.: US 12,424,062 B2
(45) Date of Patent: Sep. 23, 2025

(54) METHOD AND SYSTEM FOR PROVIDING A DOUBLE CHANCE LOTTERY GAME WITH A TRIFECTA OPTION

(71) Applicant: SCA PROMOTIONS, Dallas, TX (US)

(72) Inventors: Robert D. Hamman, Dallas, TX (US); Jay B. Ross, Delran, NJ (US)

(73) Assignee: SCA PROMOTIONS, Dallas, TX (US)

( * ) Notice: Subject to any disclaimer, the term of this patent is extended or adjusted under 35 U.S.C. 154(b) by 0 days.

(21) Appl. No.: 18/891,580

(22) Filed: Sep. 20, 2024

(65) Prior Publication Data

US 2025/0124764 A1 Apr. 17, 2025

Related U.S. Application Data

(60) Provisional application No. 63/629,366, filed on Oct. 16, 2023.

(51) Int. Cl.
*G07F 17/32* (2006.01)

(52) U.S. Cl.
CPC ........ *G07F 17/329* (2013.01); *G07F 17/3267* (2013.01)

(58) Field of Classification Search
CPC ........ G07F 17/329
See application file for complete search history.

(56) References Cited

U.S. PATENT DOCUMENTS 5,551,692 A 9/1996 Pettit et al.
5,979,894 A * 11/1999 Alexoff .................. A63F 3/065 273/269

(Continued)

FOREIGN PATENT DOCUMENTS

EP 855685 A2 * 7/1998 .......... G07C 15/006
WO WO-0174460 A2 * 10/2001 ............ A63F 3/081
WO 2021045803 A1 3/2021

OTHER PUBLICATIONS

"Powerball". Wikipedia.org. [online], [retrieved on Dec. 13, 2024]. <URL:https://web.archive.org/web/20180616135431/https://en.wikipedia.org/wiki/Arcade_game>. 21 Pages. (Year: 2024).*

(Continued)

*Primary Examiner* — Milap Shah
(74) *Attorney, Agent, or Firm* — MEAGHER EMANUEL LAKS GOLDBERG & LIAO, LLP

(57) ABSTRACT

A central lottery system and method, incorporating a non-transitory computer-readable medium which facilitates providing a public lottery game. A lottery retailer communicates a player's lottery selections via an internet connection to a central lottery system. The central lottery system incorporates a database and database management subsystem. The system and method will produce a lottery drawing at a specific date and time that incorporates three random number sources to generate a primary random number selection (white, first random number source), and two secondary random number selections (gold and silver, bonus drawings). The second number source is used for selection of the gold bonus drawing, and the third number source selects the silver bonus drawing. The system, method, and non-transitory computer-readable medium include a computer configured with a game specification file created by the lottery office. The game specification defines the characteristics of the three number drawings and their relationships to each other.

12 Claims, 19 Drawing Sheets

(56) References Cited

U.S. PATENT DOCUMENTS

| | | | | |
|---|---|---|---|---|
| 7,155,014 | B1 | 12/2006 | Hamman et al. | |
| 8,016,662 | B1 | 9/2011 | Hamman et al. | |
| 8,870,084 | B2 | 10/2014 | Hamman et al. | |
| 10,163,625 | B2 | 12/2018 | Nakamura et al. | |
| 10,191,993 | B2 | 1/2019 | Ross et al. | |
| 10,565,821 | B1 | 2/2020 | Hamman et al. | |
| 10,599,072 | B2 | 3/2020 | Hamman et al. | |
| 10,755,521 | B1 | 8/2020 | Hamman et al. | |
| 11,049,367 | B2 | 6/2021 | Hamman et al. | |
| 11,100,760 | B1 | 8/2021 | Ross et al. | |
| 11,594,104 | B2 | 2/2023 | Daley et al. | |
| 11,961,372 | B1 | 4/2024 | Ross et al. | |
| 12,039,834 | B2 | 7/2024 | Hamman et al. | |
| 2002/0180151 | A1 * | 12/2002 | Alexoff | A63F 3/0605 273/292 |
| 2004/0173965 | A1 * | 9/2004 | Stanek | A63F 3/0605 273/269 |
| 2006/0154716 | A1 * | 7/2006 | Bozeman | G07F 17/32 463/17 |
| 2006/0211483 | A1 * | 9/2006 | Padgett | G07F 17/32 463/19 |
| 2007/0005671 | A1 * | 1/2007 | Miller | G06F 7/58 708/250 |
| 2007/0026927 | A1 * | 2/2007 | Yaldoo | A63F 3/061 463/17 |
| 2009/0018942 | A1 | 1/2009 | Hamman et al. | |
| 2011/0130190 | A1 | 6/2011 | Hamman et al. | |
| 2013/0288769 | A1 | 10/2013 | Hamman et al. | |
| 2016/0337129 | A1 * | 11/2016 | Hamman | G06F 21/645 |
| 2021/0019981 | A1 * | 1/2021 | Nitz | G07F 17/3241 |
| 2023/0214187 | A1 * | 7/2023 | Pawlowski | G06F 7/588 708/250 |
| 2024/0169807 | A1 | 5/2024 | Hamman et al. | |

OTHER PUBLICATIONS

"Powerball lottery creator patents new games". LotteryPost.com. [dated Jul. 6, 2005], [online], [retrieved on Dec. 13, 2024]. <URL:https://www.lotterypost.com/news/115941>. 6 Pages. (Year: 2005).*

* cited by examiner

21

Figure 11
Double Chance Lottery
RECEIPT PRINTED ON
Tuesday July 25 2023
12:36:54 PM
Selected Numbers:
White
Gold
Silver
2 17 35 42 61
22
6
$2.00
Drawing: Wednesday July 26 2023
Retailer 320434/32043400
1234-123456789-123456
125

Double Chance Lottery Master File Record Schema

| Field | Length (Bytes) | Description | |
|---|---|---|---|
| | | | 162 |
| | | | 163 |
| 0 | 8 | Encoded index number | 164 |
| 1 | 4 | Retail ID number | 165 |
| 2 | 12 | Time and Date Purchased | 166 |
| 3 | 5 | White numbers | 167 |
| 4 | 1 | Gold numbers | 168 |
| 5 | 1 | Silver numbers | 169 |
| 6 | 1 | Win code | 170 |
| 7 | 1 | Redeem flag | 171 |
| 8 | 2 | CRC-16 | |
| | | | |
| **Total** | **35 Bytes** | | |

Figure 14

Prize Win Level Codes

210

| Win Code Decimal | Win Code Hex | White Balls Decimal | White Balls Hex | Gold Balls | Silver Balls |
|---|---|---|---|---|---|
| | | | | | |
| 0 | 00 | 0 | 000 | 0 | 0 |
| 1 | 01 | 0 | 000 | 0 | 1 |
| 2 | 02 | 0 | 000 | 1 | 0 |
| 3 | 03 | 0 | 000 | 1 | 1 |
| 4 | 04 | 1 | 001 | 0 | 0 |
| 5 | 05 | 1 | 001 | 0 | 1 |
| 6 | 06 | 1 | 001 | 1 | 0 |
| 7 | 07 | 1 | 001 | 1 | 1 |
| 8 | 08 | 2 | 010 | 0 | 0 |
| 9 | 09 | 2 | 010 | 0 | 1 |
| 10 | 0A | 2 | 010 | 1 | 0 |
| 11 | 0B | 2 | 010 | 1 | 1 |
| 12 | 0C | 3 | 011 | 0 | 0 |
| 13 | 0D | 2 | 011 | 0 | 1 |
| 14 | 0E | 2 | 011 | 1 | 0 |
| 15 | 0F | 2 | 011 | 1 | 1 |
| 16 | 10 | 4 | 100 | 0 | 0 |
| 17 | 11 | 4 | 100 | 0 | 1 |
| 18 | 12 | 4 | 100 | 1 | 0 |
| 19 | 13 | 4 | 100 | 1 | 1 |
| 20 | 14 | 5 | 101 | 0 | 0 |
| 21 | 15 | 5 | 101 | 0 | 1 |
| 22 | 16 | 5 | 101 | 1 | 0 |
| 23 | 17 | 5 | 101 | 1 | 1 |

Figure 17

METHOD AND SYSTEM FOR PROVIDING A DOUBLE CHANCE LOTTERY GAME WITH A TRIFECTA OPTION

CROSS-REFERENCE TO RELATED APPLICATION

This application claims the priority and all benefits of U.S. Provisional Application No. 63/629,366, filed on Oct. 16, 2023, the content of which is hereby incorporated by reference in its entirety.

TECHNICAL FIELD

The present invention relates to one or more lottery player's participation in a public lottery that consists of a method and system whereby, each lottery player's entry into the lottery generates an entry record into a Double Chance Lottery game database. The Double Chance Lottery game has at least three separate number drawings. The first number drawing consists of selecting randomly X numbers (without replacement), with a range of M. The second drawing consists of Y random numbers (without replacement), with a range of N. The third drawing consists of selecting randomly Z random numbers (without replacement), with a range of P. The values for X, Y, Z, M, N, P are positive integers.

BACKGROUND

The first recorded lottery occurred during the Chinese Han Dynasty between 205 A.D. and 187 B.C. A lottery was a form of gambling that involves the drawing of random whole numbers (integer) in a specific range and requires 1 or more participants to select in advance their guess of a random outcome to win at least one prize if the guess matches the drawing outcome. Lottery games consisted of a finite group of numbers that exist within a predefined range that will be randomly selected to produce a subset of numbers found within the predefined range.

The key idea of a lottery game is for a lottery contestant to guess in advance what the subset of numbers will be at the specified time of the lottery drawing. To ensure there are a sufficient quantity of number subsets, the number range must be large enough to produce a sufficient quantity of number combinations. By example, the Mega Millions Lottery (an existing very popular lottery game) has a number range of 1 to 70, with 5 of the 70 numbers randomly selected as a subset drawing. An additional bonus number is drawn separately with a range of 1 to 25, and is appended to the 5 number subset. This configuration results in the odds of winning the grand prize to be 302,575,350 to 1, which also represents the total 5 number combinations configured with a bonus number. To assist the contestant in picking numbers, the lottery system offers a courtesy feature where a contestant can request, with their paid entry, the lottery system to randomly generate 6 random number picks (5 subset, 1 bonus) and submit them automatically as the lottery entry. This process of producing machine generated "guesses" which will be automatically submitted as a contestant game entry is referred to as a "quick pick" by the industry.

In Summary:

A public lottery is a game played by one or more players selecting in advance their number guesses for a future lottery drawing. If the player matches all or some of the numbers selected during the lottery drawing, they may be entitled to a prize (based on the lottery rules).

Typical public lotteries consist of one or more players filling out an entry form for a game consisting of multiple integer numbers as a group from a range of 1 to "N", along with a single "bonus number", the bonus number will have a range of 1 to "M".

As a prior art example, the lottery game Mega Millions consists of a player picking six numbers. The first 5 numbers consist of picking different numbers from 1 to 70 (white balls) and the sixth number consists of picking a number from 1 to 25 (gold Mega Balls). A player can use a computer-based utility called Easy Pick/Quick Pick to have a machine pick the numbers for the player. A jackpot is won by matching all five white balls and the one gold Mega Ball winning numbers in a drawing. The player can win a lesser prize by matching some, but not all of the numbers drawn.

FIG. 1 is a graphical block diagram of an existing lottery system. The Lottery Office 2 is the central point of the system for creating, implementing, managing, promoting, and officiating the results of the game.

The method and process of creating a lottery draw type number game begins with the creation of the game specifications 1. The specification may be developed at a secure site external to the main lottery office 2. Communication of the game specifications may occur using a secure internet connection 4 to the main lottery office 2. The Game File Specification 1 will indicate the type of lottery game, the odds of winning the draw game, the cost associated with purchasing a ticket, the frequency of the lottery game and how to win the game.

The Lottery Office 2 authorizes various retail establishments 5 6 7 to sell lottery tickets to participants. The participants may be allowed to "pick" their own numbers to use on their ticket or they may utilize a random number generator (not shown) to select a "quick pick", where the random number generator selects the numbers to be used on the participants ticket. The retail establishments 5 6 7 communicate with the Lottery Office 2 via Secure Network 4 to inform the Lottery Office 2 of the purchased tickets details such as but not limited to date and time of sale, numbers selected, date and time of drawing the ticket is valid and vendor id.

FIG. 1 additionally shows three game participants interacting with the lottery system via the authorized retail establishments. Participant "A" 8 has purchased a lottery ticket 9 from an authorized lottery reseller 5. The authorized lottery reseller 5 communications with the main lottery office 2 through a secure connection 4. Participant "B" 10 has purchased a lottery ticket 11 from an authorized lottery reseller 6. Participant "C" 12 has purchased a lottery ticket 13 from an authorized lottery reseller 7.

When Participant 8 10 12 initiates their purchase of lottery tickets 9 11 13, resellers 5 6 7 communicate with the Lottery Office 2. Based on the number of games, either manually chosen numbers or quick picks purchased from participants 8 10 12, the resellers 5 6 7 print a ticket 9 11 13 containing the number combination for each game purchased.

Draw type Lottery Tickets 9 11 13 are valid for one lottery number drawing which will take place at a specified date, time, and a specified place using the system game result generator 3. As a nonlimiting example, the game result generator 3 can be a gravity pick or air mix mechanical machine or a computerized random number generator. The Game Result Generator 3 may or may not be located at a site external to the Lottery Office 2.

At a specified date, time and location, the game drawing occurs, and the results may be transmitted via secure network connection 4 to the main lottery office 2. The lottery game drawing is typically broadcast on live television and the results are published by the Lottery Office 2 in print media and digital media.

Participant 8 10 12 compare the number combinations on their Lottery Tickets 9 11 13 to the number combination generated by the Game Result Generator 3 by either watching the live drawing on TV, reviewing the results published in the local newspaper or on the website of the Lottery Office 2.

After checking the Lottery Ticket 9 11 13 results, Participant "A" 8 and Participant "B" 10 have discovered at least one of their number combinations matches the Game Result perfectly and are a grand prize winner. As both participants 8 10 have the grand prize winning combinations, they must split the grand prize between each other and with any other participants (not shown) which have a ticket containing the grand prize winning combination. Participant "C" 12 may or may not have had one or more secondary winning combinations on their respective Lottery ticket 13.

SUMMARY

Accordingly, a lottery game system for a lottery game is described, the system comprising: a first random number generator having a first entropy source; wherein the first entropy source is used by the first random number generator to generate a drawing result for main winning lottery numbers for the lottery game; a second random number generator having a second entropy source; wherein the second entropy source is used by the second random number generator to generate a drawing result for a first set of bonus numbers for the lottery game; a third random number generator having a third entropy source; wherein the third entropy source is used by the third random number generator to generate a drawing result for a second set of bonus numbers for the lottery game; the system is configured to accept a lottery submission from a lottery game player, the player's submission is in advance of the drawing results for the main lottery winning numbers, the first set of bonus numbers and the second set of bonus numbers; and the system is further configured to determine whether the lottery game player's submission matches respectively the drawing results for the main winning lottery numbers, the first set of bonus numbers and the second set of bonus numbers, and to determine winning prizes for the lottery game accordingly.

A method for a lottery game is also described, the method comprising: generating a drawing result for main winning lottery numbers for the lottery game by a first random number generator using a first entropy source; generating a drawing result for a first set of bonus numbers for the lottery game by a second random number generator using a second entropy source; generating a drawing result for a second set of bonus numbers for the lottery game by a third random number generator using a third entropy source; accepting a lottery submission from a lottery game player, the player's submission is in advance of the drawing results for the main lottery winning numbers, the first set of bonus numbers and the second set of bonus numbers; and determining whether the lottery game player's submission matches respectively the drawing results for the main winning lottery numbers, the first set of bonus numbers and the second set of bonus numbers, and determining winning prizes for the lottery game accordingly.

BRIEF DESCRIPTION OF THE DRAWINGS

FIG. 4 prior art Power Ball public lottery submission from;

FIG. 14 Double Chance lottery master file record schema;

FIG. 17 prize win level codes table;

DETAILED DESCRIPTION

Figure 1:
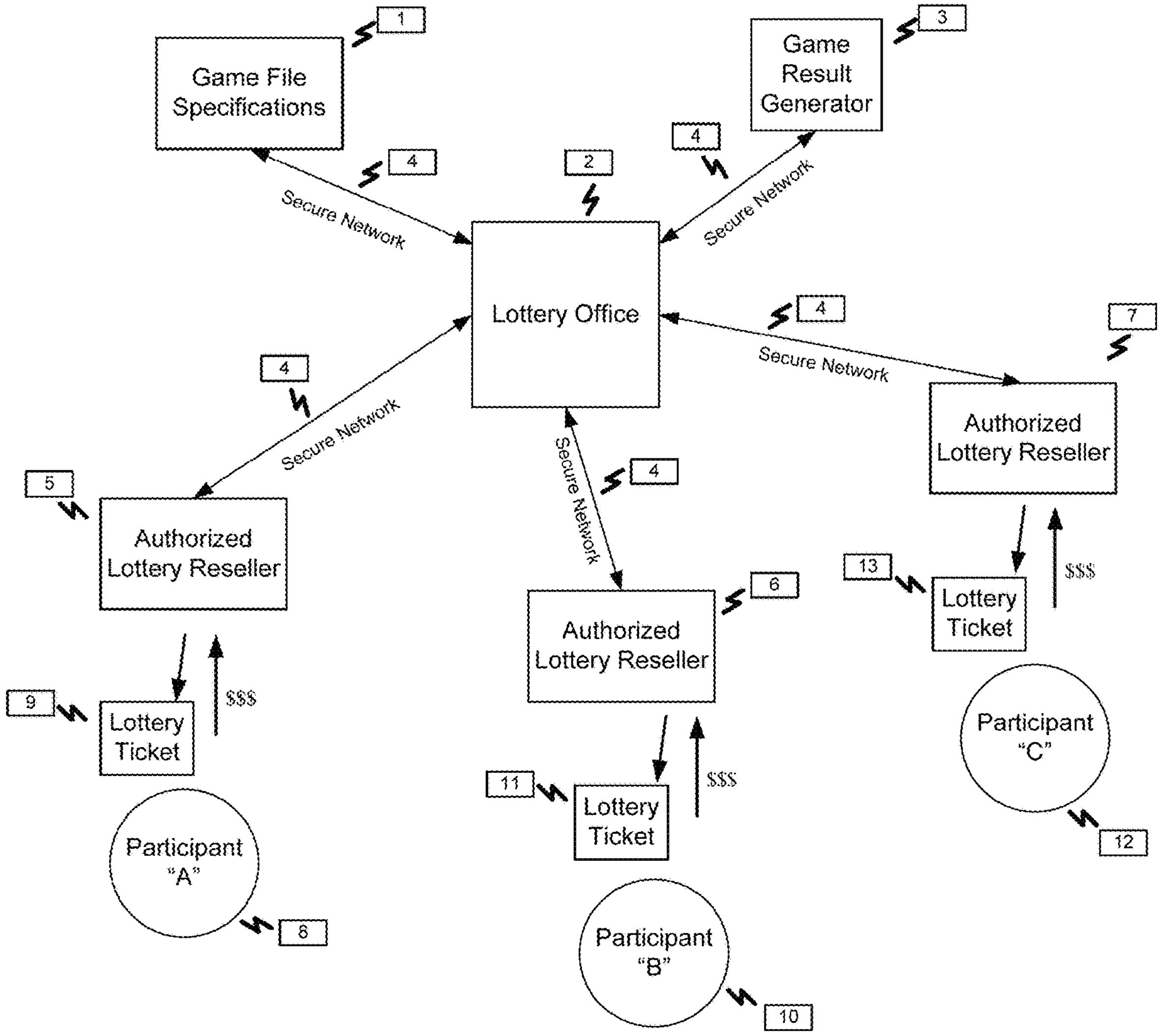
FIG. 1 prior art public lottery retail network.

The Double Chance Lottery Game is a new variant that incorporates 3 random number sources. Each random source produces integer numbers independently from each other. The random number sources are hereafter referred to as "urns", in that they can be represented by an open top opaque jar (urn) filled with balls labeled 1-N and 1-M (integer). The balls can be shuffled by shaking the urn and removed one at a time. The balls removed from the urn are considered a "group" or "subset" and represent a potential lottery winning selection.

The number groups may consist of 1 or more numbers (primary drawing numbers and bonus numbers are each their own subset).

The lottery gaming process is better understood by example, such as Mega Millions public lottery game. The rules for Mega Millions are the following:

The Double Chance Lottery Game uses 3 random number sources (urns) instead of 2.

If the player matches all 5 primary numbers for the main number group (urn #1) but does not correctly guess the bonus number (urn #2), they get a second bonus chance (urn #3). The bonus number will be selected from a third number source (urn). The player makes the alternative bonus selection at the time the primary bonus selection is made, which is in advance of the lottery drawing.

In the event the primary bonus number is selected and the player's guess does not match, the player has a second chance with a secondary bonus drawing. The second bonus number drawing occurs soon after the primary bonus number drawing. If the player correctly guessed all of the primary number group from the lottery drawing but not the primary bonus number, the player has a second chance to win a grand prize during the second bonus number drawing. If the player correctly guessed the second bonus number drawing, a secondary grand prize will be awarded.

In summary, there are 3 number selection events in the Double Chance Lottery Game.

The first drawing of random numbers from urn #1 and will consist of 5 numbers, forming a subset with a maximum number range of "Q". By example, 5 numbers in the range of 1-Q.

A second number drawing occurs from urn #2 where a single number is selected from a range of 1-C. This is the primary bonus number. By example, 1-25.

A third number drawing occurs from urn #3 where a single number is selected from a range of 1-E. This is the secondary bonus number. By example, 1-40.

An example of how the Double Chance Lottery Game works is now presented:

In advance, a player will select 5 numbers from a range of 1 to 70 inclusive. Player picks 7, 20, 27, 60, 68.

The player then selects a primary bonus number (gold) 1 to 25. Player picks 23.

The player then selects the secondary bonus number (silver) 1 to 25. Player picks 4.

The player submits their selections to an official lottery retailer using an entry form along with an entry fee to participate in a specific Double Chance Lottery Game, which are white 7, 20, 27, 60, 68, gold 23, and silver 4.

If the player matches all of the numbers from drawing 1 (urn #1) and matches the primary bonus number (urn #2) of the second drawing, they win the grand prize. If the player fails to guess the urn #2 second drawing number, they have a second chance with the third number drawing (secondary bonus drawing, urn #3). If the player matches the second bonus drawing number (urn #3) and all of the first drawing numbers (urn #1), they will receive a secondary grand prize. If a player matches all of the urn #1 white numbers but not any urn #2 gold or urn #3 silver numbers, a prize is awarded to the player that is less than either grand prize value.

It is also possible for a lottery player to receive a partial win on their initial number selections for white, gold, and silver numbers for this new Double Chance Lottery Game. For example, successfully matching 3 or more primary number selections, along with the bonus number selection could provide for a small prize winning. The structure of the Double Chance Lottery Game introduces as "new" art the successful matching of bonus numbers in concert as a new variation for small prize winnings. An example is successfully matching both primary and secondary bonus numbers without any white numbers matching. As another variation, 3 partial number matches on the primary selection (white) in concert with one or both of the bonus numbers.

The two bonus number ranges can be but are not required to be the same number range (example 1-25). In fact, it may be desirable to have different number ranges for the primary bonus (urn #2) and secondary bonus (urn #3) selections, such as 1-25 for the primary bonus number and 1-40 for the secondary bonus number. The purpose of having different number ranges is to adjust the odds of winning. Conversely, the primary and secondary bonus number ranges can be identical, providing a different scenario for the partial or full winning odds.

As an option, the lottery game may provide for a "trifecta" grand prize. In the event the player correctly matched the numbers in the primary number drawing (first drawing, urn #1), and correctly matched the primary bonus number (second drawing, urn #2) and correctly matched the value of the number in the secondary bonus drawing (third drawing, urn #3), they will be entitled to the trifecta grand prize (assuming one is offered).

Once the public lottery drawing occurs, the player can ascertain if they have won anything. In the event of winning, the lottery player can redeem their winnings at a lottery retailer or the main lottery office (depending on the specific rules).

As described previously, FIG. 1 is a block diagram showing the relationship of the lottery participant(s) 8, 10, 12, the authorized retailers 5, 6, 7, and the central lottery system 2 of a current (prior art) public lottery system. A lottery participant 8, 10, 12 purchases one or more lottery tickets 9, 11, 13 from a lottery retailer 5, 6, 7. The lottery participant 8, 10, 12 may select their lottery numbers or optionally use the lottery "quick pick" feature to machine select lottery numbers. The central lottery system 2 is bound by the lottery game specifications, which were established prior to the lottery game being opened to the public (lottery participants). The lottery game specifications 1 are made available to the public using printed documents or "online" digital means (not shown).

At the approved time, a public lottery drawing occurs and may be produced by the lottery game result generator 3. All electronic communications to or from the central lottery system 2 is conducted using secure data communications 4. In the event that a lottery participant 8, 10, 12 wins a prize (usually monetary), they may redeem their lottery tickets 9, 11, 13 at a lottery retailer 5, 6, 7 if below a specified monetary amount as defined in the game specification 1 or if the winnings are greater than the specified amount, the participant can redeem their lottery tickets 9, 11, 13 at the lottery central office 2.

Figure 2:
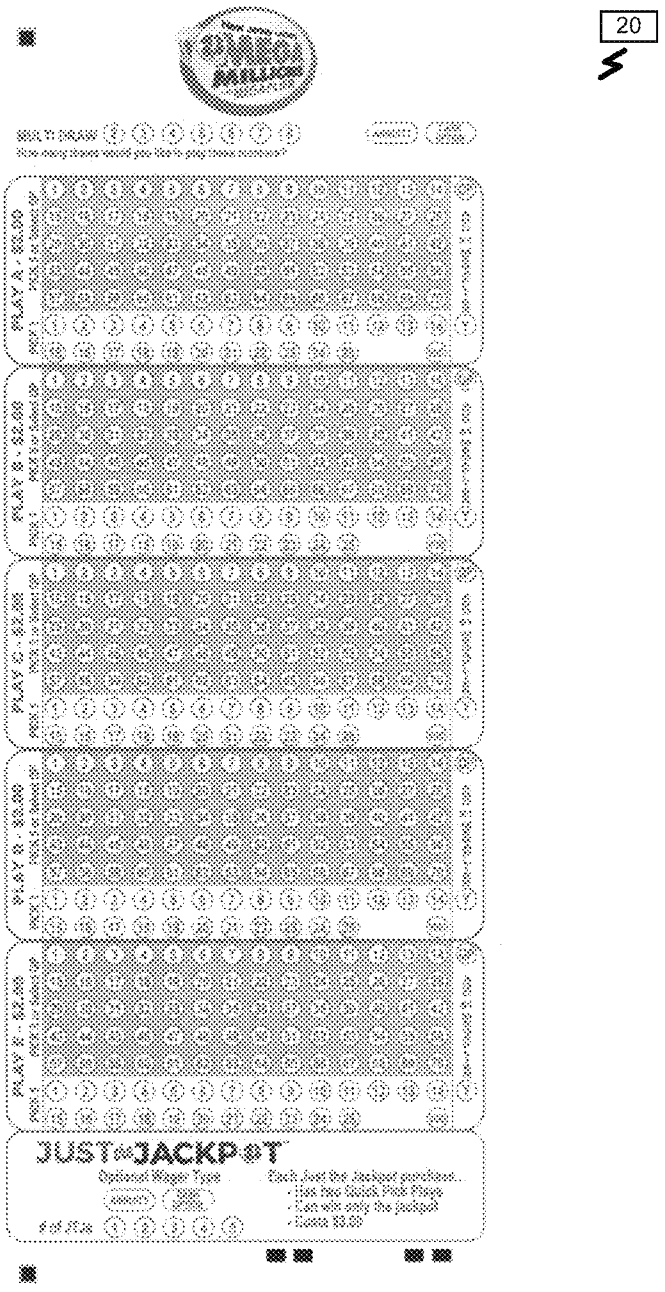
FIG. 2 prior art lottery submission form for Mega Millions game.

FIG. 2 is an example for a lottery submission form 20 for the public lottery game Mega Millions. The submission form 20 is used by the lottery participant to submit their entries for a public lottery drawing. The submission from 20 in FIG. 2 permits multiple entries by a lottery participant into a specific Mega Millions Lottery drawing. Numbers are selected on the submission form 20 by "blanking out" the numbers selected.

Figure 3:
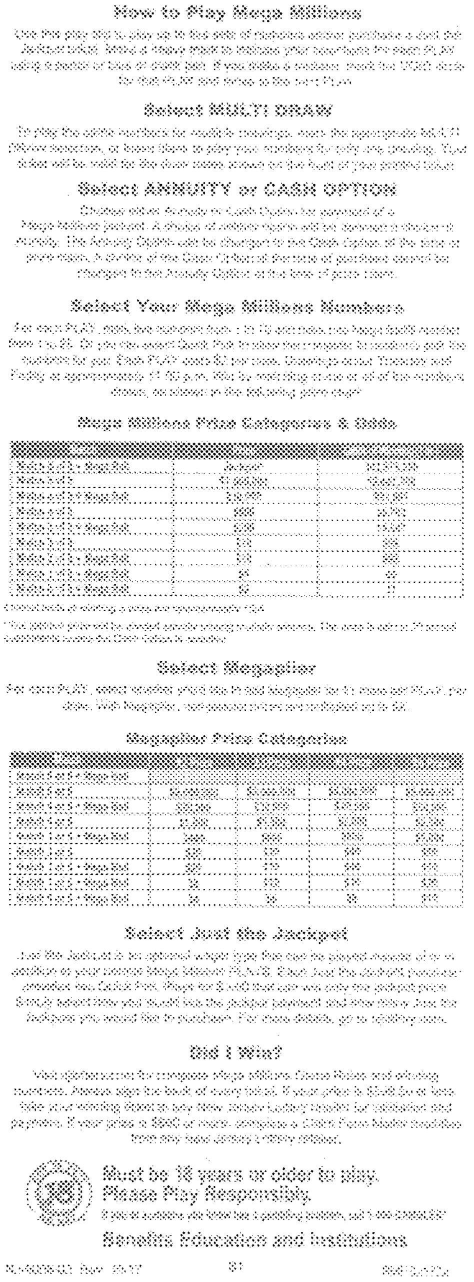
FIG. 3 prior art Mega Millions public lottery pay table.

FIG. 3 is a "pay table" 21 for a lottery game submission form for Mega Millions shown in FIG. 2. The pay table 21 are established as part of the game specification.

Figure 4:
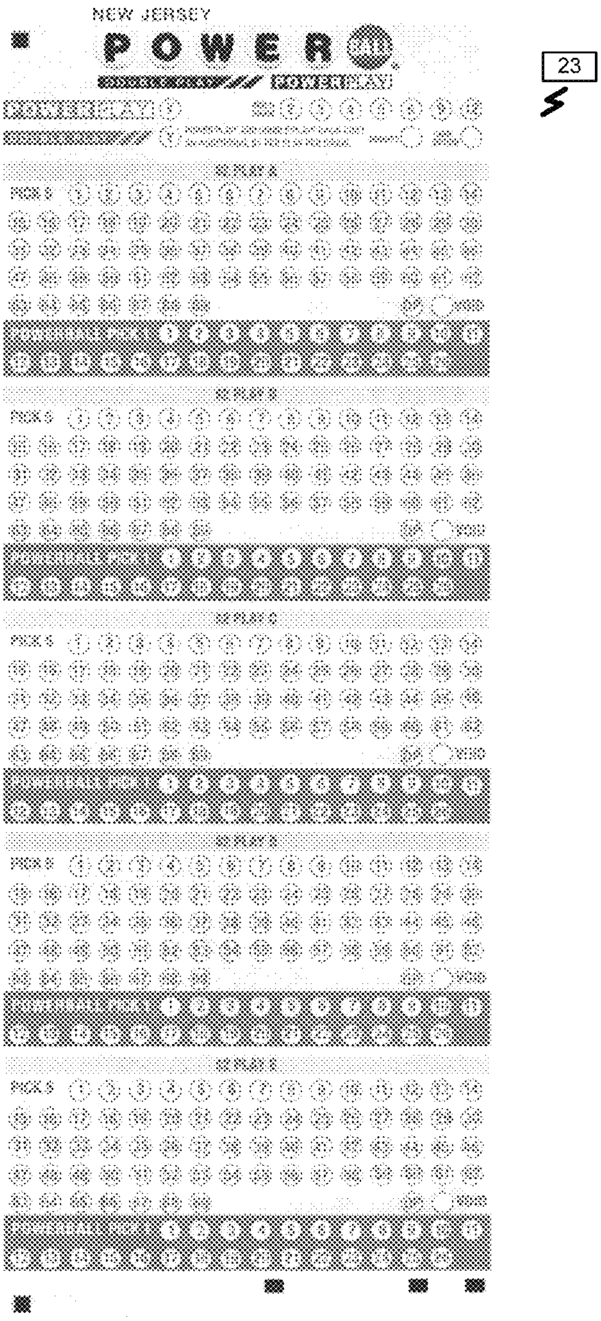

FIG. 4 is another prior art submission form for a different lottery game (Power Ball) 23.

Figure 5:
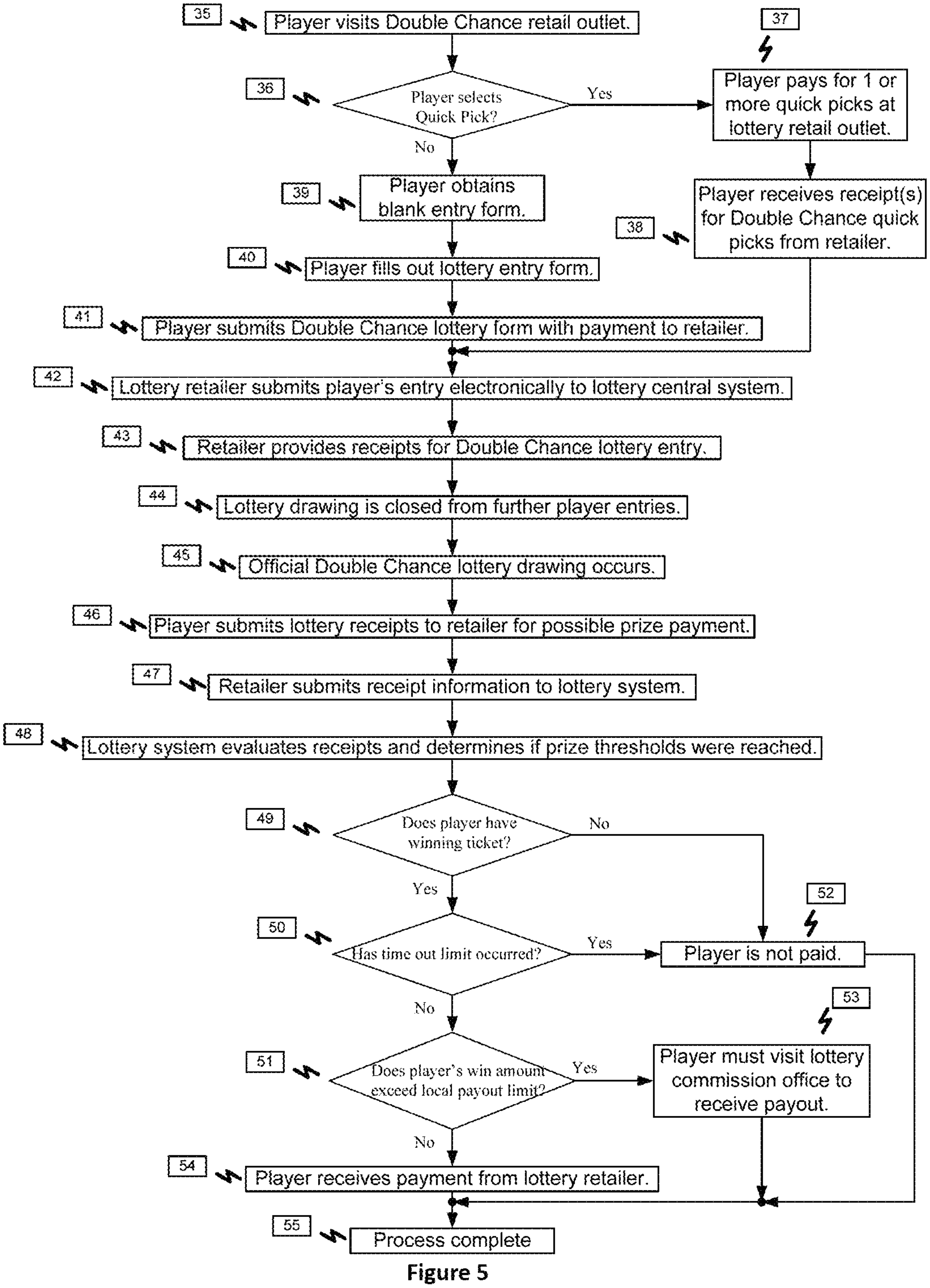
FIG. 5 manual entry method for Double Chance lottery.

FIG. 5 is a flow chart demonstrating the manual process a player will be subjected to when entering one or more submission for a Double Chance Lottery Game.

Figure 8:
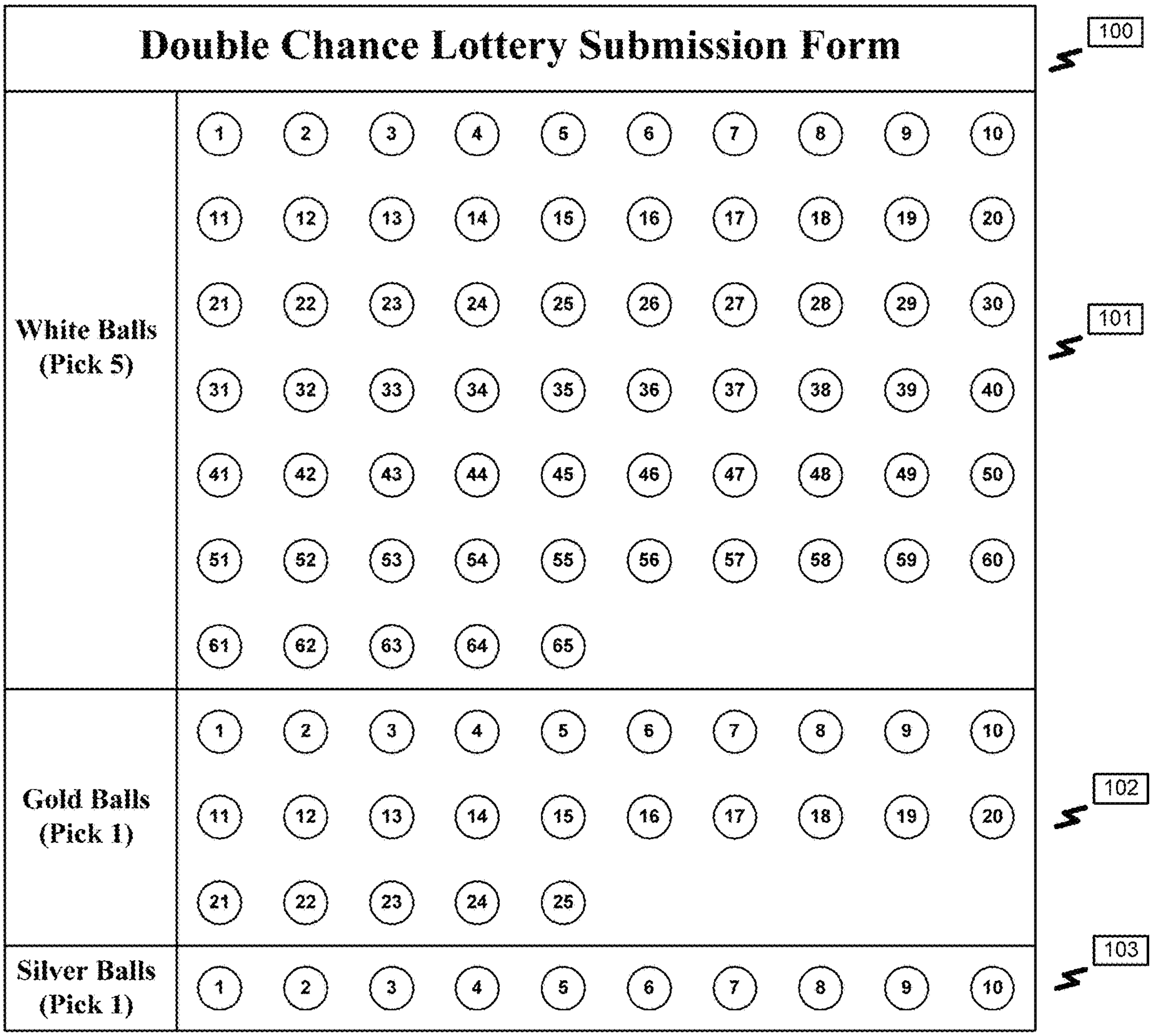
FIG. 8 example of blank entry form for public Double Chance lottery submission.
Figure 10:
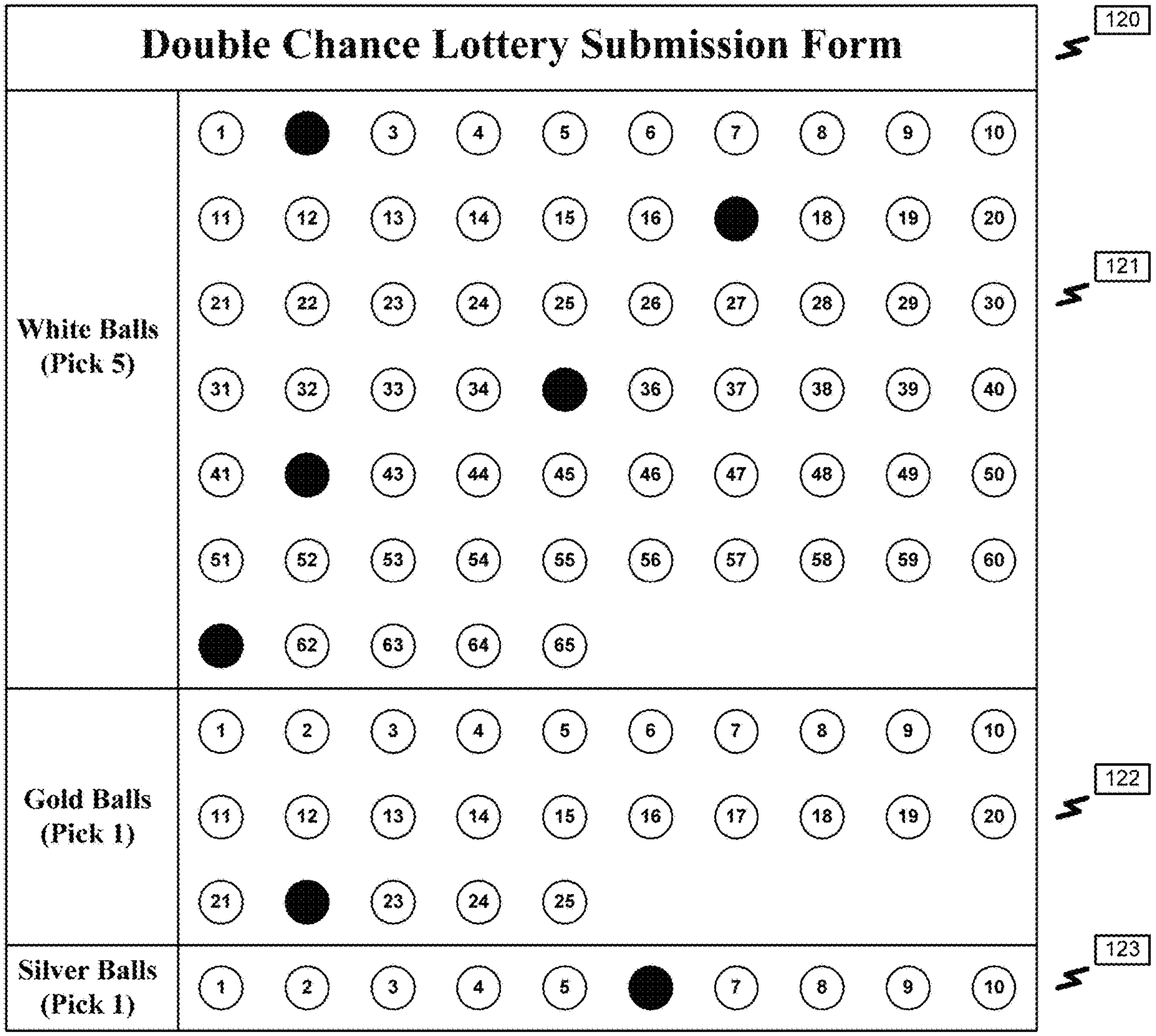
FIG. 10 example of completed from for Double Chance lottery submission.

The manual entry process starts at step 35 where a lottery player visits an authorized lottery retailer. The player may fill out and submit a completed Double Chance submission form (as seen in FIGS. 8 and 10) or request a "quick pick". Step 36 shows the decision point for selecting player derived numbers or quick pick numbers. If the player wishes one or more quick picks, the process proceeds to step 37 and 38. If the player wishes to submit a "player selected" entry, steps 39, 40, and 41 are executed. At step 42 the lottery retailer submits the player's request for one or more submissions to the central lottery system. At step 43 the lottery retailer provides the lottery participant with a receipt for their selection(s). Step 44 occurs when the time window for player submissions is closed. At step 45 the public drawing occurs for a Double Chance Lottery.

Once the public drawing for a Double Chance Lottery has occurred, the player may submit lottery receipts (for the public game drawing that has already occurred) to any authorized lottery retailer for possible payment of prize winnings at step 46. The lottery retailer will submit electronically the player's receipts to the central lottery systems at step 47. At step 48 the lottery system compares the selected player numbers (done in advance of the Double Chance Lottery drawing) to the actual numbers selected during the public Double Chance Lottery drawing. At step 49 the central lottery system determines if the lottery player has any full or partial winning number matches. If the player's submission does not result in any winnings, the process proceeds to step 52.

At step 50 the system checks the current date and calculates the time elapsed from the day of the Double Chance drawing. The rules for the lottery game will define a time limit as to when a player can request payment on a prize value (typically one year). If the time window has been exceeded, the process moves to step 52, otherwise it proceeds to step 51.

At step 51 the central system determines if the player's prize winnings exceed a threshold for payment at a lottery retailer. The threshold for lottery retail payments was established a part of the lottery game rules. If the player's winnings are below the payment threshold, the process continues to step 54. At step 54 the player receives payment from a lottery retailer and proceeds to step 55 where the process of buying a lottery ticket, waiting for a public drawing, and redeeming a payout (if a prize was won) is complete.

Figure 6:
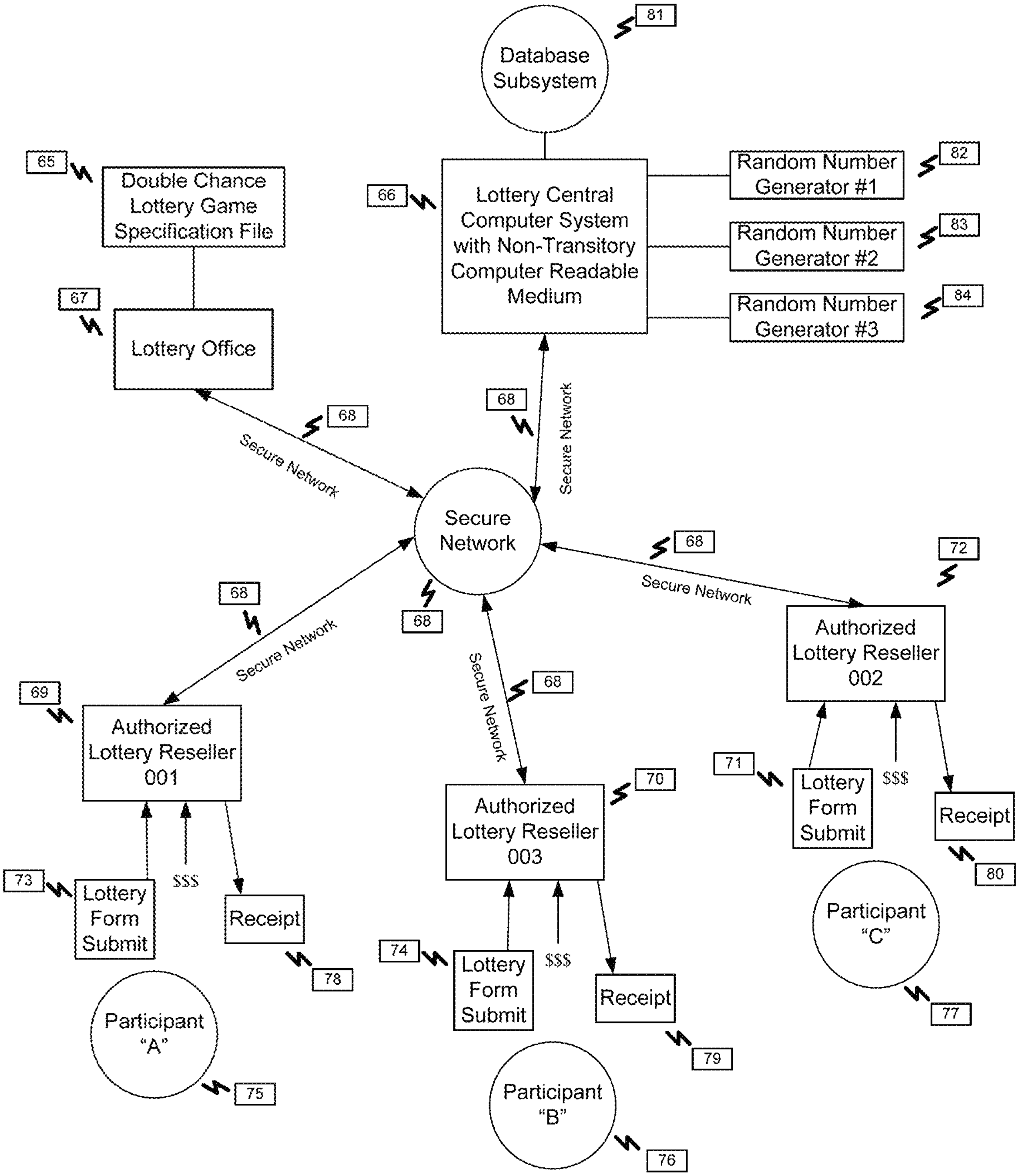
FIG. 6 Double Chance public lottery retail network.

FIG. 6 is a block diagram showing the relationship of the lottery participant(s) 75, 76, 77, the authorized retailers 69, 70, 72, and the lottery office 67 of a Double Chance Lottery system. A lottery participant 75, 76, 77 purchases one or more lottery tickets 71, 73, 74 from a lottery retailer 69, 70, 72. The lottery participant 75, 76, 77 may select their lottery numbers or optionally use the lottery "quick pick" feature to machine select lottery numbers. The central computer system 66 is bound by the lottery game specifications, which were established prior to the lottery game being opened to the public (lottery participants). The Double Chance Lottery game specification file 65 are made available to the public using printed documents or "online" digital means (not shown). As is well known in the art, a computer system, including a central computer such as the central computer system 66 may comprise one or more processors and at least one memory for storing computing instructions, so that the computing instructions when executed by the one or more processors, will configure the one or more processors to perform accordingly.

Once a lottery participant 75, 76, 77 selects their guess for the future Double Chance Lottery drawing with an authorized lottery retailer 69, 70, 72, the central computer system 66 will process and create a file on the database subsystem 81, to record the Double Chance Lottery player's entry into the target Double Chance Lottery drawing in the future. Once a lottery participant's submission is recorded on the central computer system 66, the central computer system 66 sends back to the lottery retailer 69, 70, 72 an electronic receipt for the lottery participant's transaction. The lottery retailer 69, 70, 72 will print a "hardcopy" of the receipt 78, 79, 80 and provide it to the lottery participant 75, 76, 77.

At the approved time, a Double Chance public lottery drawing occurs and may be produced by the lottery central computer system with non-transitory computer readable medium 66. All electronic communications to or from the central computer system 66 is conducted using secure data communications 68. The central computer system 66 will record (by manual entry by an authorized lottery employee operator or electronically) the number drawing performed by the random number generators 82, 83, 84. The context of the number drawings is defined by the specification file 65.

In the event that a lottery participant 75, 76, 77 wins a prize (usually monetary), they may redeem their lottery tickets 71, 73, 74 at a lottery retailer 69, 70, 72 if below a specified monetary amount as defined in the Double Chance Lottery game specification file 65 or if the winnings are greater than the specified amount, the participant can redeem their lottery tickets 71, 73, 74 at the lottery central office 67.

As a non-limiting example, if the range of the white number drawing is 1-70, and 5 numbers are to be drawn, the white combination outcome could be 5, 17, 35, 47, 52. The random number generator #1 82 will produce this outcome. The gold bonus number by example will be in a range of 1-25 and by example, the number 23 is produced by random number generator #2 83. The silver bonus number has a range of 1-10 and by example, the number 5 is produced by random number generator #3 84. The complete Double Chance Lottery drawing example numbers drawn is: white 5, 17, 35, 47, 52, gold 23, and silver 5.

Figure 7:
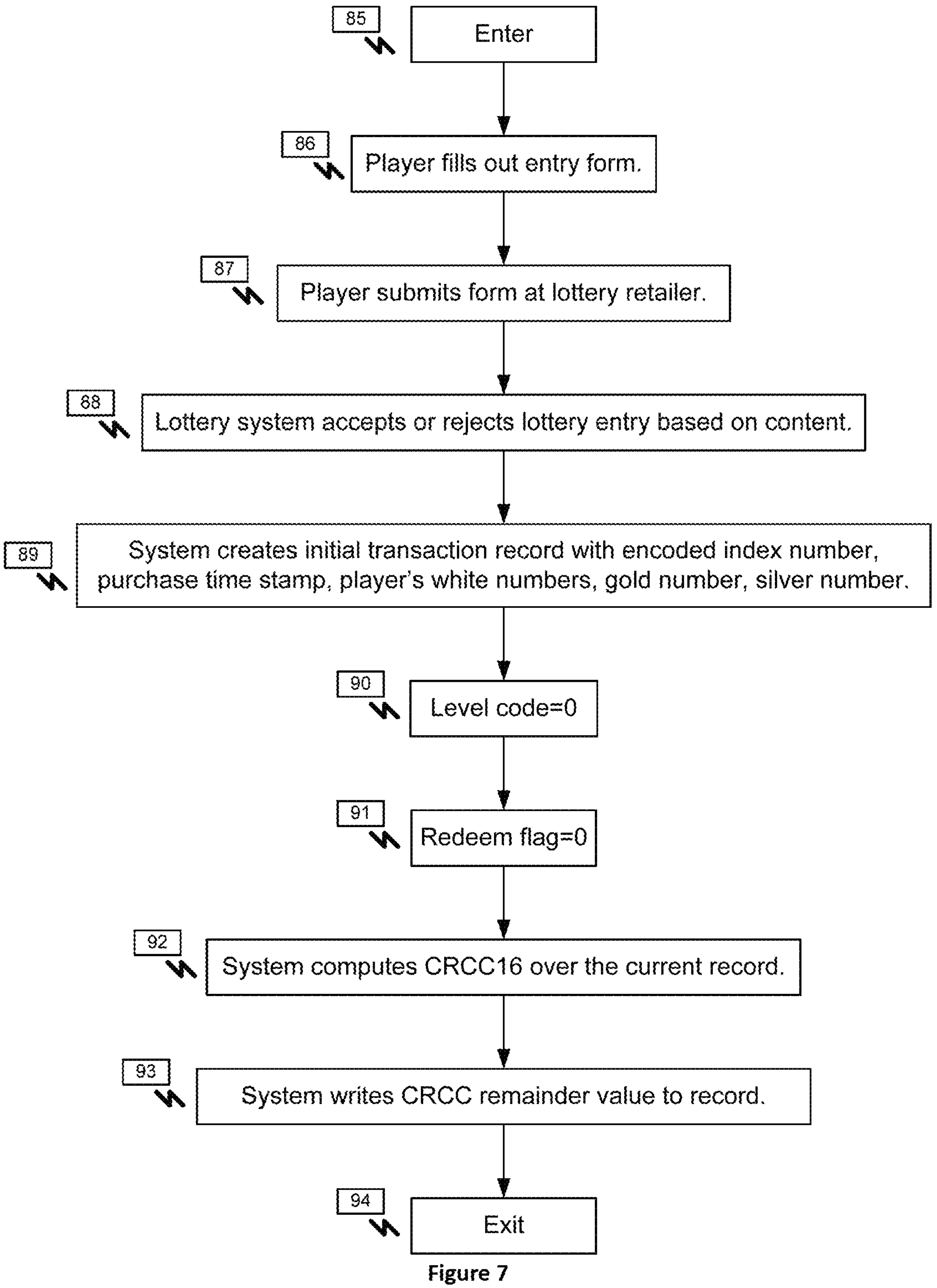
FIG. 7 initial player central system interaction.

FIG. 7 provides further detail on the process of entry and playing the Double Chance Lottery. The process starts at step 85 and proceeds to step 86 where the lottery player obtains a blank entry from (see FIG. 8) and fills it out with their number picks for the double chance lottery. At step 87 a lottery retailer submits the player's entry data to the central lottery system. At step 88 the central lottery system accepts or rejects the player's submission. Reasons for rejection can be the player undersubscribed or oversubscribed the white, gold, and silver number entries. At step 89 (assuming the player's entry data was accepted by the central system), a record in a Double Chance Lottery event is created. As part of this process, a unique transaction reference is produced to tag the player's entry for the lottery. At step 90 and 91 the level code and redeem flag are set to 0. This is in anticipation for the Double Chance drawing in the future. After the drawing, the system will evaluate all entries for possible winners. The level code will at his time be potentially modified if any prize values were detected for a specific database entry.

The redeem flag will be changed to a 1 if and when a player request any prize payment from a specific lottery entry. At step 92 the central system calculates a CRCC checksum over the entry record, and writes the checksum into the record at step 93. The use of the CRCC checksum ensures that record corruption is detected. At step 94 the record generation process is complete.

FIG. 8 is an example of a blank submission form 100. A player will fill it out to submit their entry into a specific Double Chance Lottery Game. It should be noted that an area for identifying white number picks 101, gold number picks 102 and silver number picks 103 must be filled out correctly. As an example, five white numbers are selected, one gold number is selected and one silver number is selected.

Figure 9:
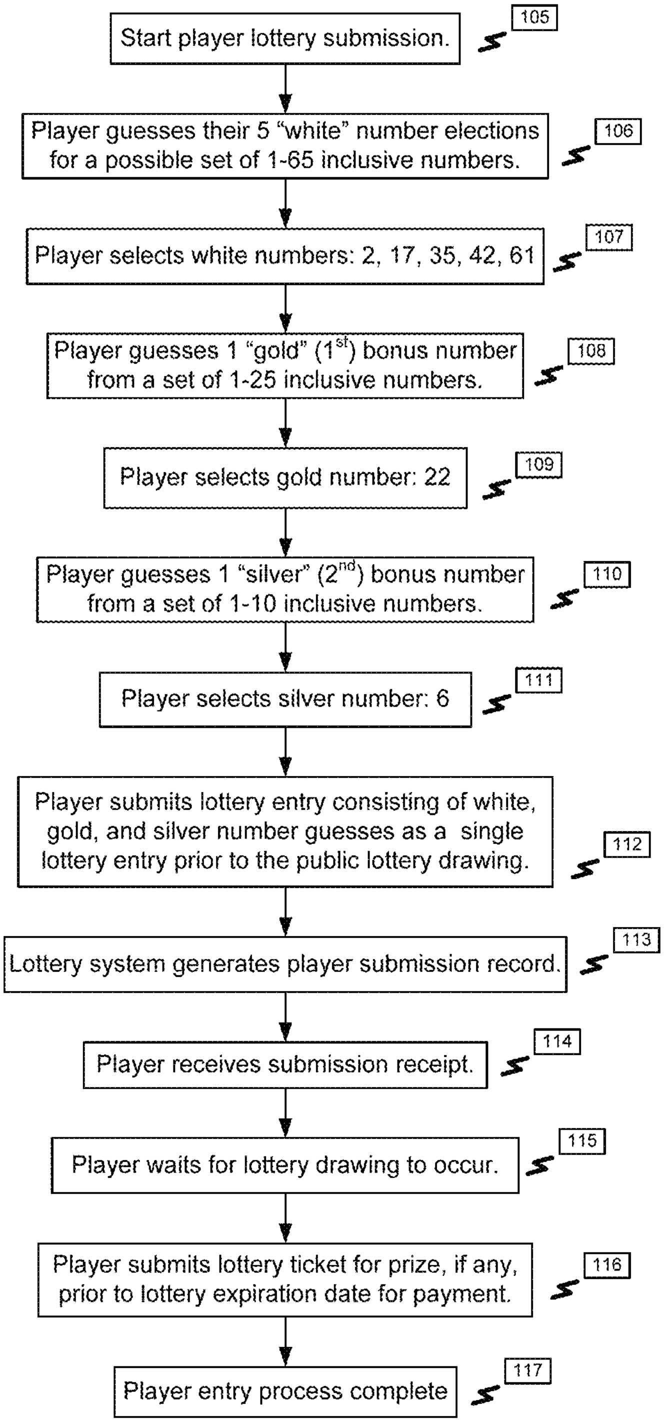
FIG. 9 example player submission for public Double Chance lottery game.

FIG. 9 flowcharts an example of a player selecting the numbers white 2, 17, 35, 42, 61, gold 22, and silver 6. In step 105 the player has a Double Chance blank entry form. Step 106 the white numbers available to the player is 1 through 65 inclusive. Step 107 the players "fills in" the white numbers 2, 17, 35, 42, 61. Step 108 the available gold numbers are 1 through 25 inclusive. The player selects the gold number 2 at step 109. Step 110 the available silver numbers are 1 through 10 inclusive. Step 111 the player selects the silver number 6. At step 112 the player submits the completed lottery submission from (FIG. 10) to a lottery retailer. Step 113 the lottery retailer submits the player's picks electronically for a future Double Chance Lottery drawing and the lottery central system checks in for errors and creates a database record (FIGS. 5 and 7). At step 114 the lottery retailer generates a receipt (see FIG. 11) and provides the receipt to the player. Step 115 the player waits for the public drawing of the Double Chance Lottery to occur. Step 116 the player submits to a lottery retailer their receipts for the Double Chance Lottery and the central lottery system will determine if any winnings occurred, and require payment. At step 117 the submission process is complete.

FIG. 10 is an example of the lottery submission form 120 filled in as per the example presented in FIG. 9. As with the blank form (FIG. 8), there is a selection for white numbers 121, gold number 122, and silver number 123.

Figure 11:
FIG. 11 example of public Double Chance lottery ticket submission receipt.

FIG. 11 is an example lottery receipt 125 as per the example found in FIG. 9. It should be noted that the receipt identifies the time and date the Double Chance Lottery submission occurred on, the white, gold, and silver numbers selected by the player, the public drawing date for the Double Chance Lottery drawing, the retailer ID, an encoded index number (submission ID), and the price paid by the player for the lottery submission.

Figure 12:
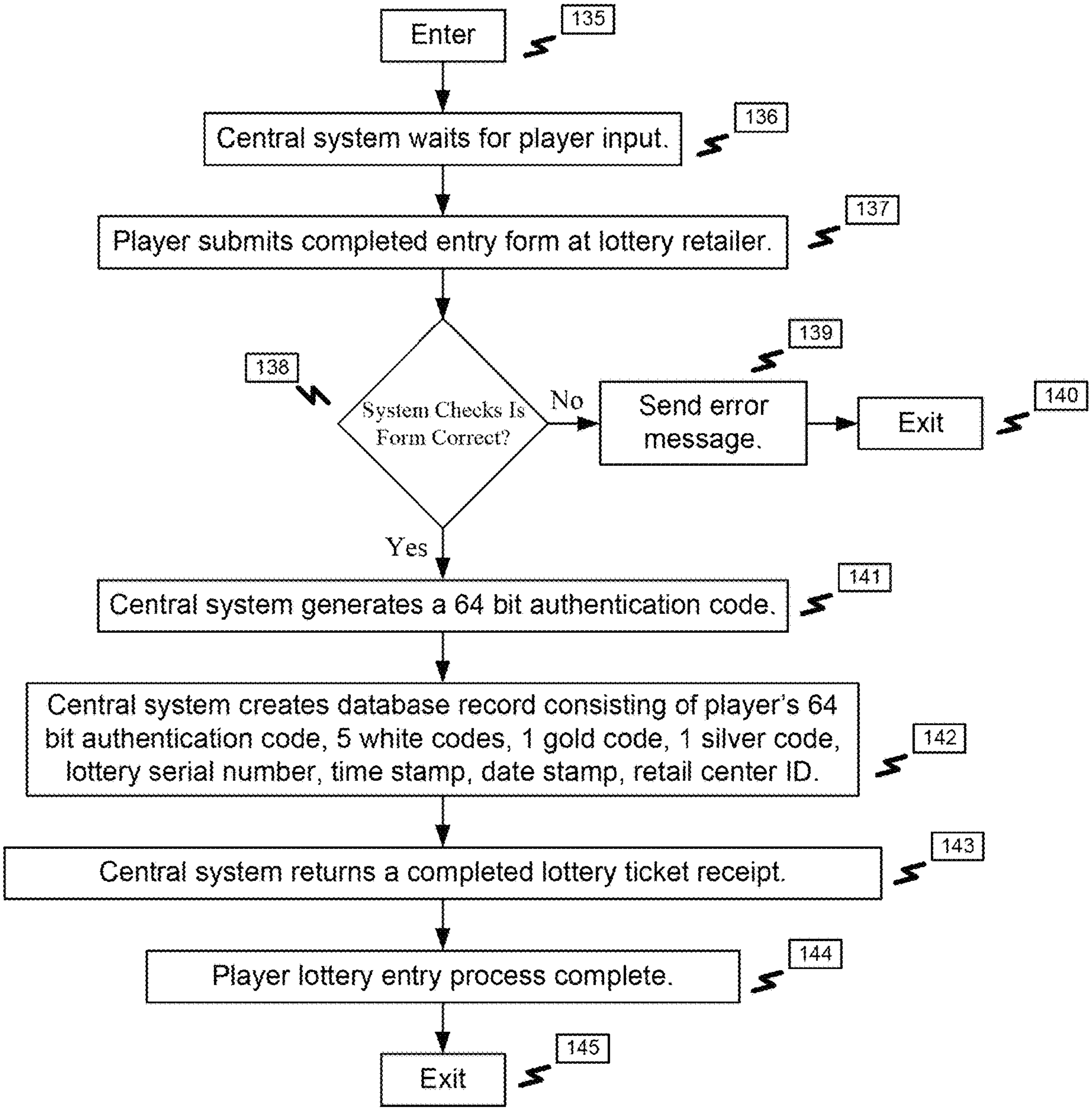
FIG. 12 Double Chance public lottery central system player entry authentication function.

FIG. 12 provides further detail with regard to the central lottery system creating a player submission record. At step 135 the record generation process commences. At step 136 the central system waits for any input from a lottery retailer with regard to a Double Chance Lottery submission. At step 137 a player presents a completed Double Chance Lottery submission form to a lottery retailer. The retailer in turn submits the player's lottery number picks to the central lottery system using a digital communications pathway. Step 138 the central lottery system checks the player's submission (via retailer) for errors or omissions. If the submission form has an error, step 139 is executed (send error message) and the process exits at step 140.

If the submission is current, step 141 is executed which produces a 64-bit authentication code (by example). The authentication process is described in FIG. 13. At step 142 a record is created for the Double Chance Lottery (on a specified date) which will include at least the authentication code, and the player's white, gold, and silver numbers. The central system returns information for lottery receipt at step 143. The lottery entry processes completed at step 144 and exits at step 145.

Figure 13:
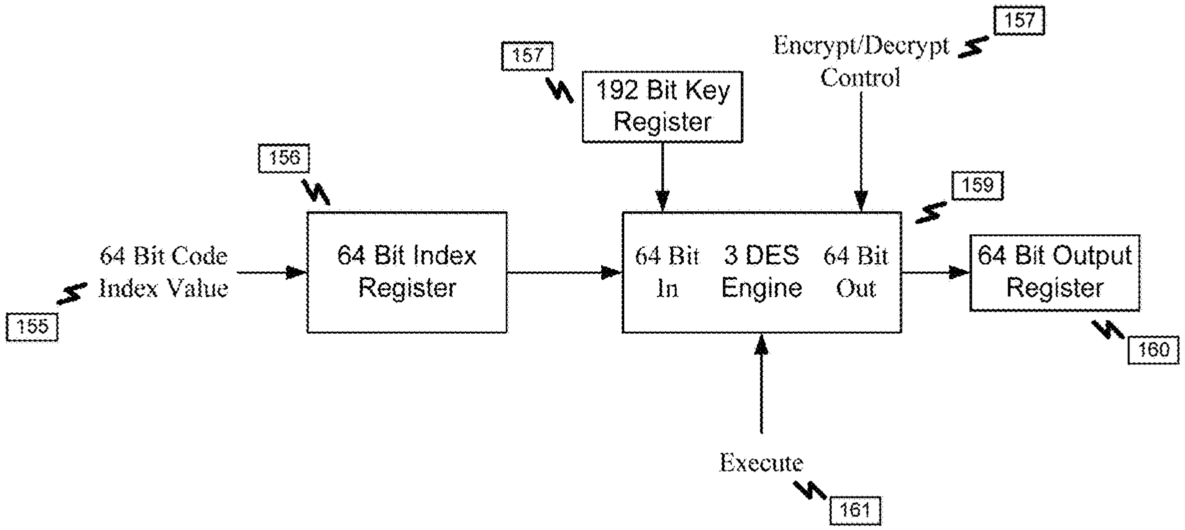
FIG. 13 Double Chance lottery authentication code encode/decode engine.

FIG. 13 shows an example of an authentication encoder/decoder that is based on a symmetric key triple DES encryption/decryption process. The DES subsystem can be implemented in hardware or software. The purpose of the DES subsystem is to obscure the index values used to access the submission records located in the lottery central system. The core record indexing system is linear in use. What is meant by linear is that the record index values start at 0 and increment by one. Thus, the first record on the database will be index value 0. It is desirable to use the index number as an authentication code but to "scramble" it so it appears random. There are many benefits of using this method to produce an authentication code, but the most obvious is not to alert a player as to how many tickets have been purchased.

Specifically, the 3-DES method of producing authentication codes works in the following manner:

To encode an index number, the 3-DES control encrypt/decrypt is set to 1 to encrypt. A confidential systemic key is loaded in the 192-bit key register 157. The 64-bit index 155 is stored in a system variable (not shown). For each index value transformation, the index number is incremented by 1. So, by example, if there are 1,000 records, the index value would be 999. After encryption, the 64-bit output value will become the record authentication code. The key value will be constant for both encryption and decryption, but will change with every new Double Chance Lottery offering.

To recover the index value to "look up" the contents of a specific record, the control is switched to decrypt, then the 64-bit authentication code is input to the 64-bit registration 156 and the decryption process will place the original index number in the 64-bit output register 160. The symmetric key 3-DES process can be viewed as a 1 to 1 "mapping" of 64-bit input codes to 64-bit unique output codes. The mapping changes for every key value in a very large set of "mapping vectors".

FIG. 14 provides detail on a non-limiting example record database 162. The record format is a fixed length (35 bytes). The fixed length format allows for a simple process of writing and reading records by multiplying the record index number by 35. The record contains the following fields: encoded index number 163, retail ID number 164, time and date purchased 165, white numbers 166, gold numbers 167, silver numbers 168, win code 169, redeem flag 170, and CRC-16 171.

Figure 15:
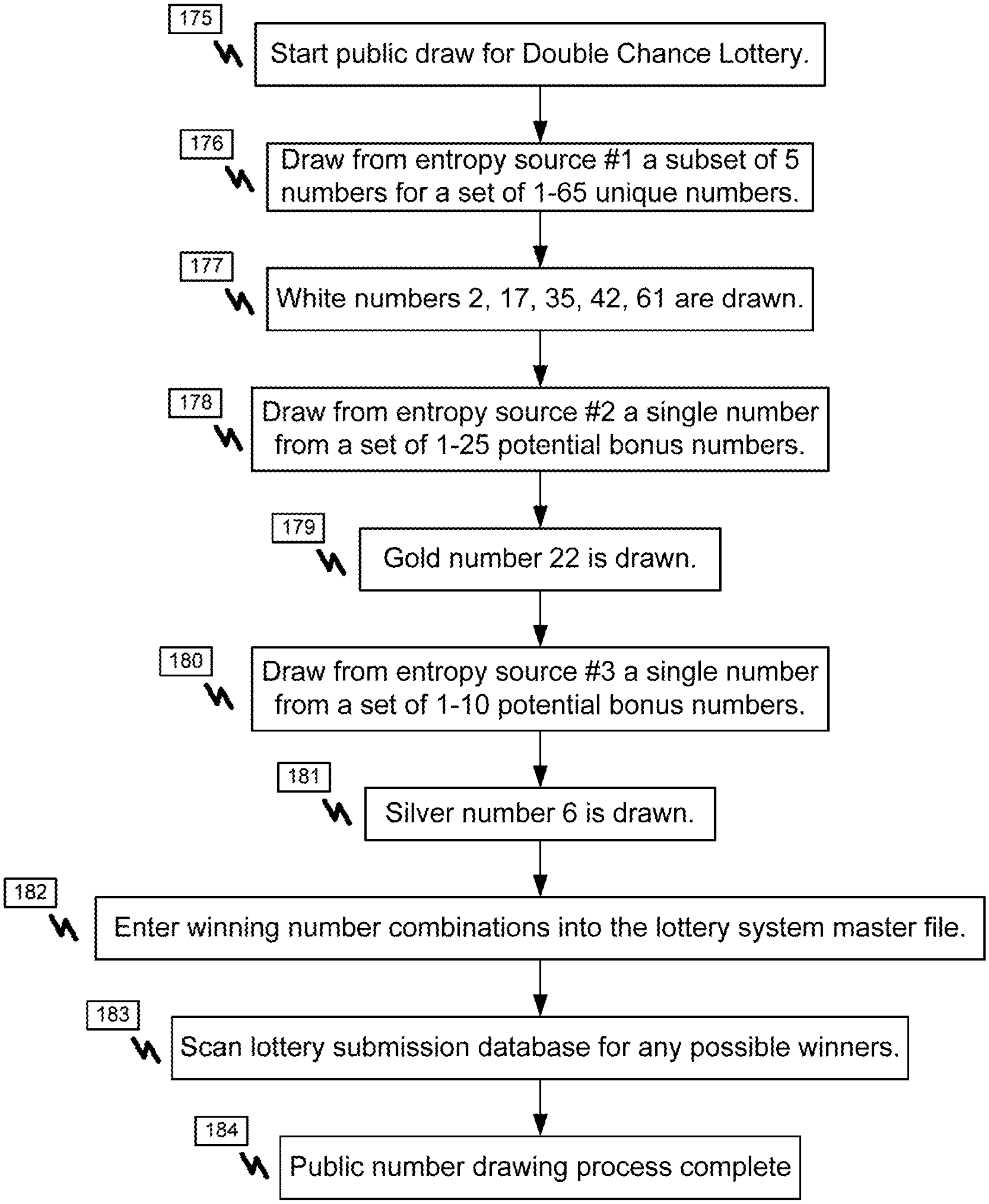
FIG. 15 example of number selection of Double Chance public lottery game drawing.

FIG. 15 exemplifies in the form of a flowchart the public drawing of numbers for the Double Chace Lottery. At step 175 the allotted time and date a Double Chance Lottery will commence, using 3 separate entropy sources (random number generators). The first entropy source by example produces integer numbers in the range of 1 through 65 inclusive, without replacement. By example, at step 176 the first entropy source produces the "white" numbers. At step 177 the white numbers 2, 17, 35, 42, and 61 are drawn from the first entropy source. At step 178 the second entropy source (independent) will produce the "gold" integer numbers in the range of 1 through 25 inclusive. Step 179 the gold number 22 is drawn from the second entropy source. At step 180 by example a single "silver" number is drawn from the third independent entropy source in the range of 1 through 10 inclusive. At step 181 the silver number 6 is drawn from the third entropy source. Once the Double Chance drawing is complete and the resulting drawn values are recorded on the lottery master file, all player records prior to the drawing (and associated with the current drawing) are evaluated for possible winnings. The winner analysis occurs at steps 182 and 183. Step 184 completes the drawing and winner evaluation process. As is well known in the art, a random number generator may be either a software based Pseudo Random Number Generator (PRNG) or a hardware/physically based True Random Number Generator (TRNG) (see, e.g., https://www.wolfssl.com/true-random-vs-pseudorandom-number-generation/, or https://www.researchgate.net/post/Difference_between_TRNG_or_PRNG#:~:text=The%20difference%20between%20true%20random,(completely%20computer%2Dgenerated).

Figure 16:
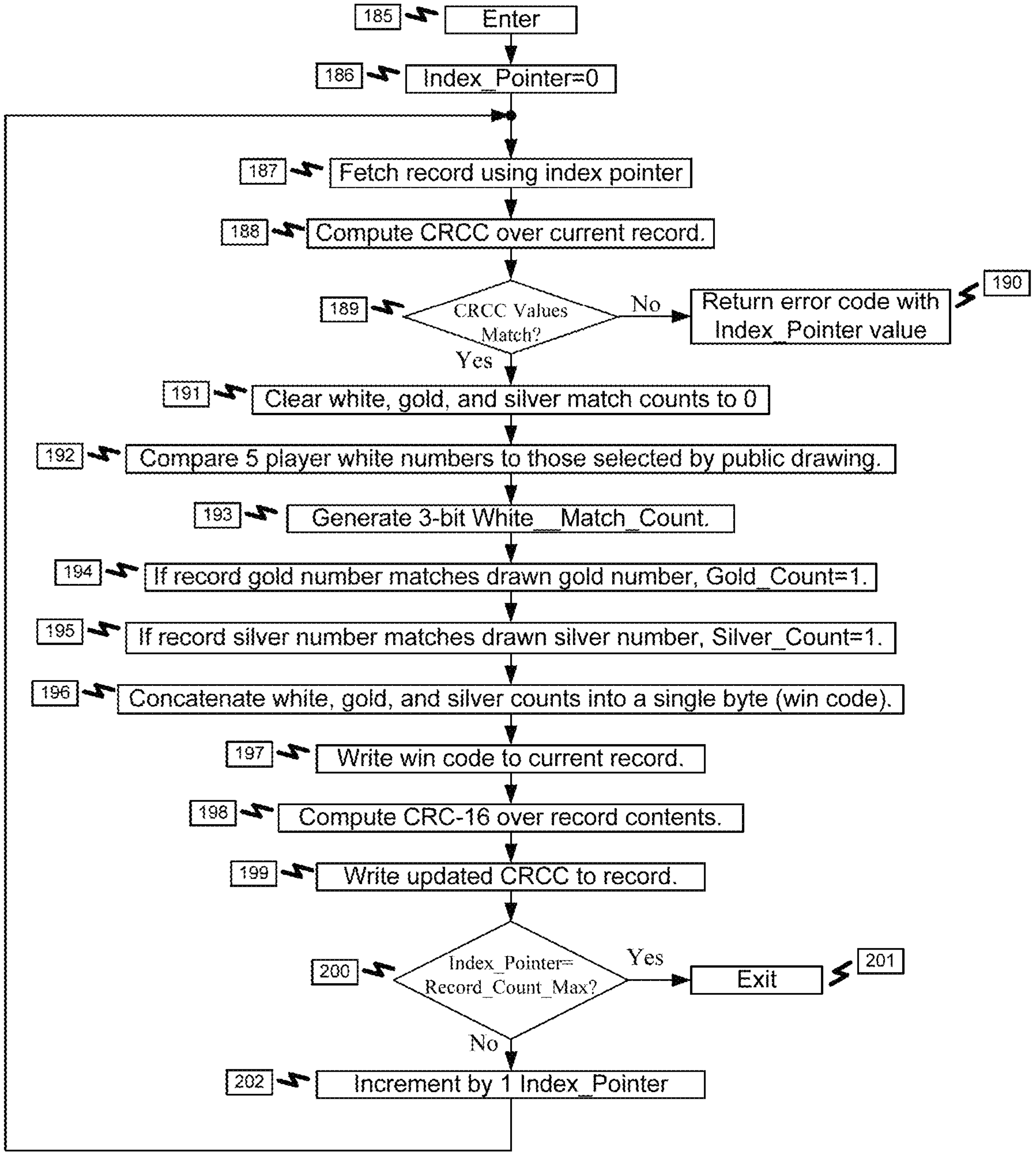
FIG. 16 Scan and update double chance lottery records after public number drawing to determine record win.

FIG. 16 shows as a flowchart the process of evaluating all player submission records for a Double Chance Lottery and generating win codes. Step 185 starts the process. Step 186 initializes the scan index pointer used to fetch a record to zero. Step 187 uses the index pointer to fetch the current record. Step 188 computes the CRCC checksum for the current record based on the current record contents. Step 189 verifies the stored value of the CRCC remainder is correct. Step 190 is executed if the CRCC checksum does not match the stored value in the record, and returns an error code with the record index value. Step 191 executes if the CRCC check indicates the stored CRCC checksum is valid and set to zero the white, gold, and silver match counts. Step 192 determines the matches between the record white number selections when compared to the actual lottery drawing white values. Step 193 converts the white number matches into a 3-bit total white match value. Step 194 sets the gold number match count if the record gold number matches the actual drawn lottery gold value. Step 195 sets the silver count to 1 if the record value for the record silver value matches that of the lottery drawn value. Step 196 combines the match counts of white, gold, and silver numbers into a single 5-bit win code value. The win code range is 0 to 23 decimal. Step 197 writes the record win code to the current record index pointer with a field of 6 decimal (see table in FIG. 14). Step 198 computes a new CRCC record checksum. Step 199 writes the new CRCC checksum into the current record. Step 200 checks to see if the last record has been validated with a win code. If yes, the process exits via step 201. If no, a loop back occurs to step 187 after incrementing the index pointer at step 202.

FIG. 17 provides a nonlimiting example of a win code list. The win codes allow for numeric processing for all combinations of full or partial number groups. The win codes found in FIG. 17 210 consist of a 3-bit white code concatenated with a combination 2-bit gold/silver bonus combination (gold and silver are 1-bit each). Win codes are inserted into the player request records after a public drawing occurs. With 5 white numbers guessed at by the lottery player (example), the number can be 0-5 or a 3-bit number.

Figure 18:
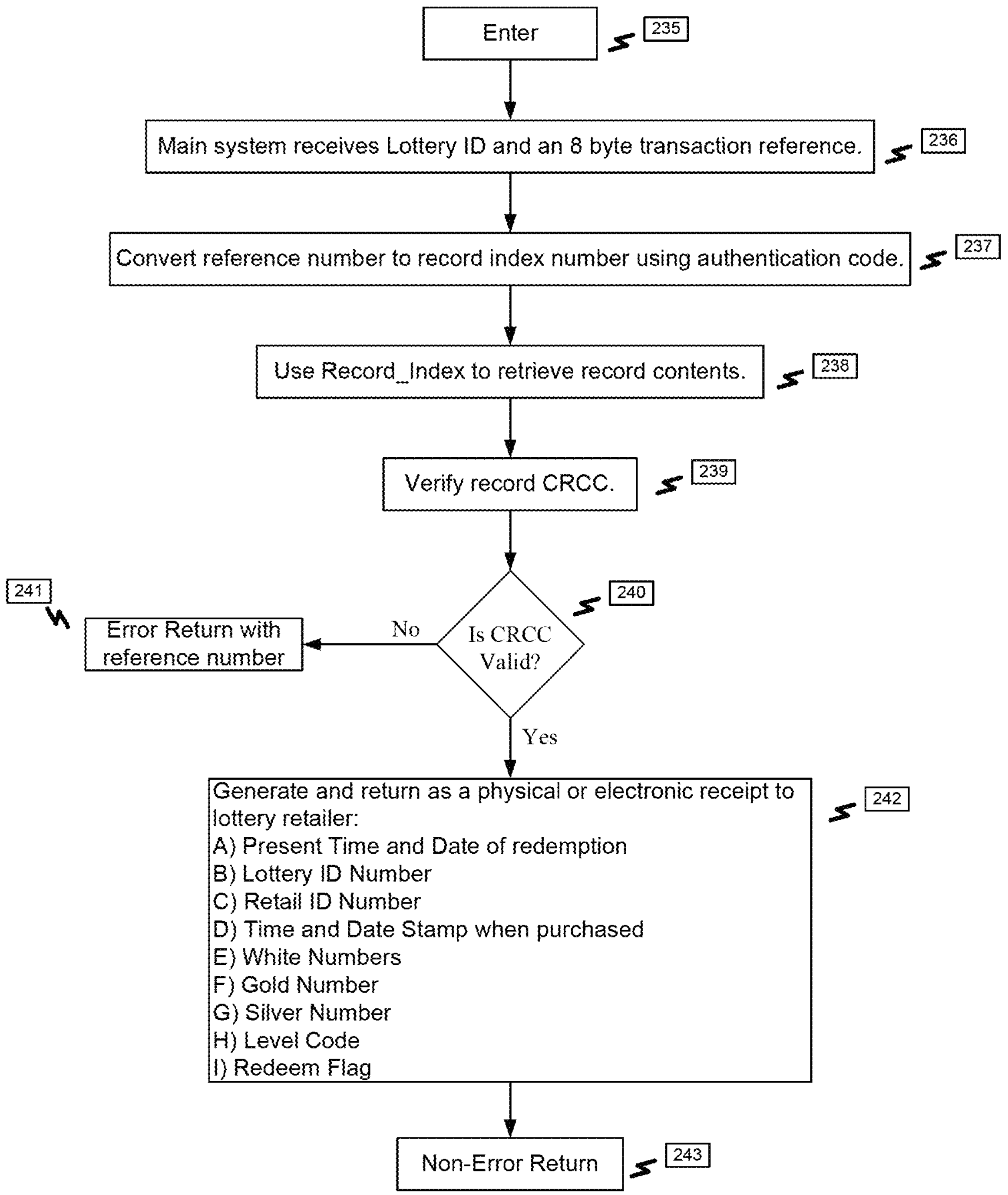
FIG. 18 generation of lottery entry receipt index.

FIG. 18 shows the process in flow chart format for the generation of a lottery entry index. The process starts at 235. At step 236 the main lottery system receives (by internet) a lottery identification and an 8-byte transaction reference. At step 237 the reference is connected to a record index number using an authentication code as a key to decrypt the reference number, and connect it to an index value. At step 238 the index value is used to retrieve the purchase record for the lottery player. At step 239 the record CRCC is computed and compared to the CRCC stored value within the record. At step 240 a decision is made on the validity of the record CRCC. If the CRCC is in error, step 241 is performed and an error return occurs. Otherwise, step 242 is executed. Step 242 returns to the lottery retailer the record contents provided by the index value. Finally, the process exits at step 243.

Figure 19:
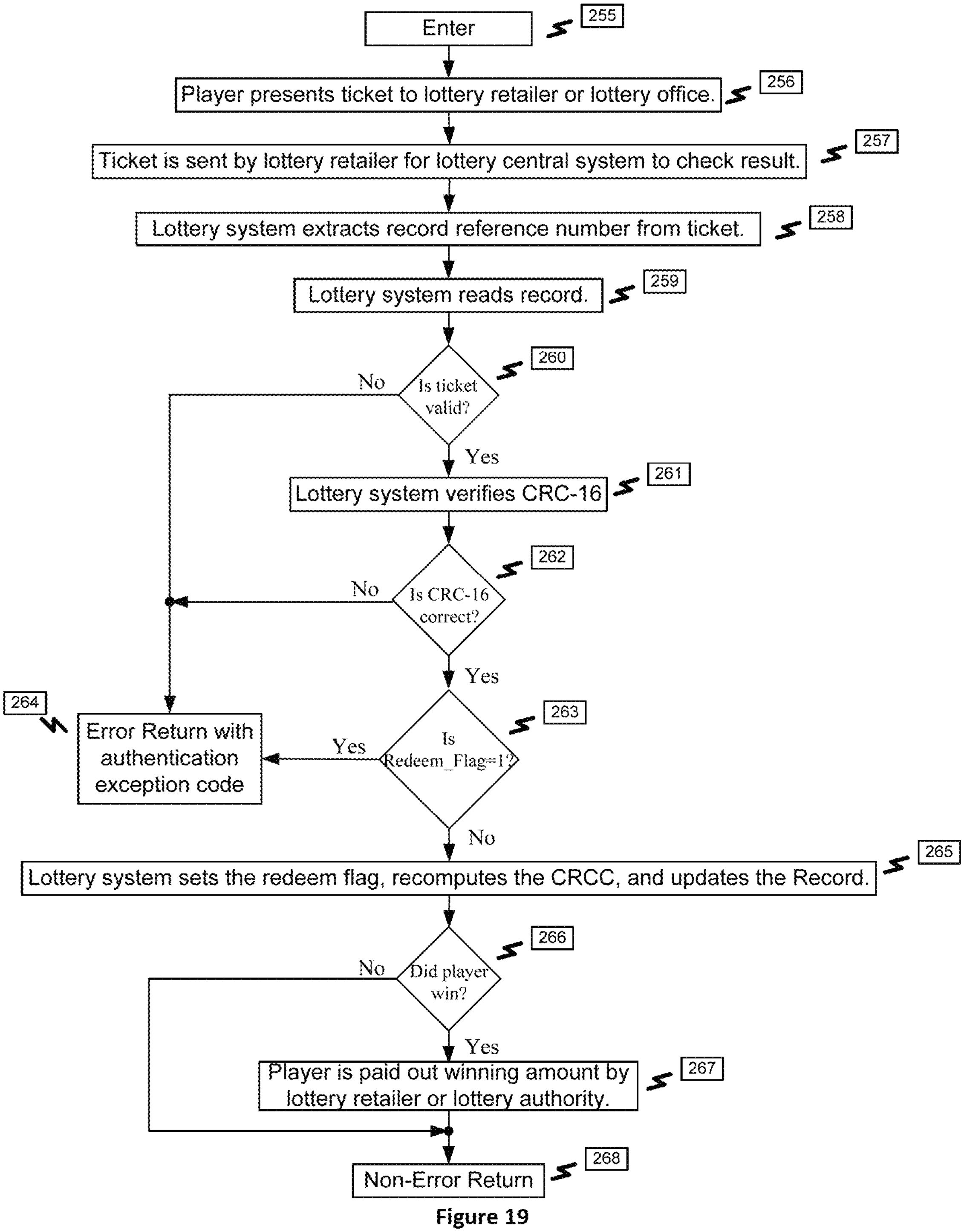
FIG. 19 redemption processing function.

FIG. 19 presents the redemption process by which a player can redeem a prize based on a lottery ticket (receipt). The process starts at 255. At step 256 a player presents their printed ticket provided when a lottery entry was made. At step 257 the lottery retailer scans the ticket and transmits the ticket information to the central lottery computer. At step 258 the lottery system extracts the reference number. At step 259 the lottery system generates a record index number and retrieves a record based on the index numbers. The record contents will identify the purchase transaction made by the player. At step 260 a verification step occurs to verify the ticket contents as valid. If not valid, step 264 occurs with an authentication error redeem code. Otherwise, step 261 occurs where the system verifies the record CRC-16 checksum. At step 262 if the checksum is incorrect, the process performs an error return at step 264. If the CRCC checksum is current, the process proceeds to step 263 to check the redeem flag for the record. If the ticket has previously been redeemed, step 264 is executed to indicate an error has occurred, and the system should not permit a prize redemption. If the redeem flag has not been previously sent, the process flow continues to step 265 where the redeem flag is set, the CRCC is recomputed, and the record is updated. At step 266 the contents of the player's record are analyzed for any winners. If there were no winners, the process exits at step 268. Otherwise step 267 occurs where the lottery system commands the lottery retailer to pay the player. If the pay amount exceeds the retailer pay limit, then the lottery authority must pay the player. Finally, step 268 is executed resulting in exiting the redemption process.

The invention claimed is:

1. A lottery game system for a lottery game, comprising:

a first random number generator having a first entropy source; wherein the first entropy source is used by the first random number generator to generate a drawing result for main winning lottery numbers for the lottery game;

a second random number generator having a second entropy source; wherein the second entropy source is used by the second random number generator to generate a drawing result for a first set of bonus numbers for the lottery game;

a third random number generator having a third entropy source; wherein the third entropy source is used by the third random number generator to generate a drawing result for a second set of bonus numbers for the lottery game;

wherein at least one of the first, second and third random number generators is a hardware based true random number generator;

the system is configured to accept a lottery submission from a lottery game player, the player's submission is in advance of the drawing results for the main lottery winning numbers, the first set of bonus numbers and the second set of bonus numbers; and the system is further configured to determine whether the lottery game player's submission matches respectively the drawing results for the main winning lottery numbers, the first set of bonus numbers and the second set of bonus numbers, and to determine winning prizes for the lottery game accordingly; and wherein the system is further configured to provide a chance to match the lottery game player's submission for the drawing result of the second set of bonus numbers only if the lottery game player's submission for the drawing result of the first set of bonus numbers does not match.

2. The system of claim 1, wherein the first entropy source is used by the first random number generator to generate a subset of N unique numbers as the main winning lottery numbers from a set of M unique numbers, wherein M>N.

3. The system of claim 2, wherein the second entropy source is used by the second random number generator to generate a first number of unique bonus numbers as the first set of bonus numbers, and the third entropy source is used by the third random number generator to generate a second number of unique bonus numbers as the second set of bonus numbers for the lottery games, wherein the first and the second numbers are integer numbers.

4. The system of claim 3, wherein the first number is equal to the second number.

5. The system of claim 1, wherein the first, second and third entropy sources are different sources.

6. The system of claim 1 wherein the first, second and the third random number generators are respectively a first, a second and a third urn of balls.

7. A method for a lottery game, comprising:

generating a drawing result for main winning lottery numbers for the lottery game by a first random number generator using a first entropy source;

generating a drawing result for a first set of bonus numbers for the lottery game by a second random number generator using a second entropy source;

generating a drawing result for a second set of bonus numbers for the lottery game by a third random number generator using a third entropy source;

wherein at least one of the first, second and third random number generators is a hardware based true random number generator;

accepting a lottery submission from a lottery game player, the player's submission is in advance of the drawing results for the main lottery winning numbers, the first set of bonus numbers and the second set of bonus numbers;

determining whether the lottery game player's submission matches respectively the drawing results for the main winning lottery numbers, the first set of bonus numbers and the second set of bonus numbers, and determining winning prizes for the lottery game accordingly; and providing a chance to match the lottery game player's submission for the drawing result of the second set of bonus numbers only if the lottery game player's submission for the drawing result of the first set of bonus numbers does not match.

8. The method of claim 7, wherein the first entropy source is used by the first random number generator to generate a subset of N unique numbers as the main winning lottery numbers from a set of M unique numbers, wherein M>N.

9. The method of claim 8, wherein the second entropy source is used by the second random number generator to generate a first number of unique bonus numbers as the first set of bonus numbers, and the third entropy source is used by the third random number generator to generate a second number of unique bonus numbers as the second set of bonus numbers for the lottery games, wherein the first and the second numbers are integer numbers.

10. The method of claim 9, wherein the first number is equal to the second number.

11. The method of claim 7, wherein the first, second and third entropy sources are different sources.

12. The method of claim 7 wherein the first, second and the third random number generators are respectively a first, a second and a third urn of balls.

* * * * *